(12) United States Patent
Amemiya et al.

(10) Patent No.: US 7,349,131 B2
(45) Date of Patent: Mar. 25, 2008

(54) IMAGE FORMING APPARATUS

(75) Inventors: Kanae Amemiya, Tokyo (JP); Kohji Hikawa, Tokyo (JP); Shohji Asanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 984 days.

(21) Appl. No.: 10/209,899

(22) Filed: Aug. 2, 2002

(65) Prior Publication Data

US 2003/0030847 A1    Feb. 13, 2003

(30) Foreign Application Priority Data

Aug. 13, 2001 (JP) ............................. 2001-245144
Nov. 26, 2001 (JP) ............................. 2001-358771

(51) Int. Cl.
*H04N 1/04* (2006.01)
*H04N 1/46* (2006.01)

(52) U.S. Cl. ................. 358/474; 358/497; 358/494; 358/506

(58) Field of Classification Search ............ 358/474, 358/497, 494, 496, 506
See application file for complete search history.

(56) References Cited

U.S. PATENT DOCUMENTS

| | | | | |
|---|---|---|---|---|
| 4,862,289 A | * | 8/1989 | Shimada | 347/247 |
| 4,989,099 A | * | 1/1991 | Koshiyouji et al. | 358/474 |
| 5,345,403 A | * | 9/1994 | Ogawa et al. | 361/681 |
| 6,064,498 A | * | 5/2000 | Taniguchi et al. | 358/498 |
| 6,389,241 B1 | * | 5/2002 | Cernusak et al. | 399/44 |
| 6,462,839 B1 | * | 10/2002 | Short | 358/474 |
| 6,836,340 B2 | * | 12/2004 | Yoshihara et al. | 358/1.15 |
| 6,930,805 B2 | * | 8/2005 | Araki et al. | 358/496 |
| 2003/0030847 A1 | | 2/2003 | Amemiya et al. | |
| 2004/0190016 A1 | * | 9/2004 | Gatto et al. | 358/1.6 |

FOREIGN PATENT DOCUMENTS

| | | |
|---|---|---|
| JP | 5-323060 | 12/1993 |
| JP | 8-149239 | 6/1996 |
| JP | 10-315586 | 12/1998 |
| JP | 11-198496 | 7/1999 |
| JP | 2001-018479 | 1/2001 |

OTHER PUBLICATIONS

U.S. Appl. No. 10/941,828, filed Sep. 16, 2004, Amemiya.

* cited by examiner

*Primary Examiner*—Houshang Safaipour
(74) *Attorney, Agent, or Firm*—Oblon, Spivak, McClelland, Maier & Neustadt, P.C.

(57) ABSTRACT

An image forming apparatus receives image data from a plurality of external input means and forms an image on a sheet of paper based on the image data. In the image forming apparatus, an operation part for a user to perform an input/output operation is provided in the front side of the housing formed with a stage. Additionally, an extended housing is provided on the housing so that the top of the extended housing is higher than the location of the operation part. Further, a light emitting part for indicating the operational status of the image forming apparatus is provided on the extended housing.

10 Claims, 8 Drawing Sheets

IMAGE FORMING APPARATUS

BACKGROUND OF THE INVENTION

1. Field of the Invention

The present invention relates to a multifunctional type image forming apparatus that is equipped with functions of image forming apparatuses, such as a FAX, a copying machine and a printer, that can receive respective image data from various external input means, such as a facsimile (FAX), personal computer (PC) and the like, and can form images on paper based on the image data.

2. Description of the Related Art

Conventionally, the multifunctional type FAX that is equipped with the functions of a FAX, a copying machine, a printer and the like has been available commercially. There is a multifunctional type FAX that is connectable to a plurality of external input machines, such as a FAX, a PC and the like, and can print based on transmitted image data. In this multifunctional type FAX, there is a case where transmitting/receiving of data using the multifunctional type FAX's own input part is suspended (interrupted) during the time when transmitting/receiving of data is performed between the multifunctional type FAX and a plurality of external input machines simultaneously.

Additionally, when a user of a PC uses the multifunctional type FAX as a printer, similar to the above mentioned case, there is a case where data transmission to the multifunctional type FAX is performed and the multifunctional type FAX is unusable because of trouble with a paper feeding mechanism, for example, and the data transmission is canceled.

As a matter of course, it is preferable for working efficiency that these unplanned cancellations be prevented from occurring. Accordingly, as shown in FIG. 1, there is a conventional FAX that has a light emitting diode (LED) 1, which indicates the operational status of the FAX, in a front side of an operation panel 2, with which a user inputs various operation modes, so that the user can determine whether or not the FAX can be used according to the LED 1.

The conventional FAX as shown in FIG. 1 normally includes the operation panel 2 and the LED 1 for displaying the operational status. The operation panel 2 is provided in the front side of an housing 3 and with a height convenient for the user, and has various input keys, numeric pads, a display part and the like. The LED 1 is provided in the front side of or near the front side of the operation panel 2

For this reason, when the user is operating the operation panel 2 while standing in front of the operation panel 2, it is difficult for the user to visually recognize a light emitting state of the LED 1, since the user has to look down at the LED 1. In addition, when someone is standing in front of the operation panel 2, or when there is an obstacle in the light path of the LED 1 between the operation panel 2 and the user, since the operation panel 2 is provided in a comparatively low position due to considerations of operability, it is difficult for a user who is apart from (not close to) the conventional FAX, to visually recognize the light emitting state of the LED 1 immediately when the user wants to use the FAX, and to determine the availability status of the FAX.

SUMMARY OF THE INVENTION

It is a general object of the present invention to provide an improved and useful image forming apparatus in which the above-mentioned problems are eliminated.

A more specific object of the present invention is to provide an image forming apparatus having a simple structure, with which it is possible to visually recognize and check on the operational status of the image forming apparatus effectively regardless of whether a user is near to or apart from the image forming apparatus.

In order to achieve the above-mentioned objects, there is provided according to one aspect of the present invention, an image forming apparatus that receives image data from a plurality of external input means and forms an image on a sheet of paper based on the image data, including: an operation part for a user to perform an input/output operation in a front part of a housing formed with a step; an extended housing provided on the housing such that the top of the extended housing is higher than the location of the operation part; and a light emitting part for indicating the operational status of the image forming apparatus, the light emitting part being located on the extended housing.

Additionally, according to another aspect of the present invention, the light emitting part may be provided at the highest part of the extended housing.

According to the above-mentioned aspects of the present invention, since the light emitting part for indicating the operational status is provided at the higher (highest) part of the entire housing including the extended housing, it is possible for the light emitting part to be visible in a comparatively broad area. Thus, it is possible to visually recognize the light emitting state of the light emitting part even in cases where a special structure is not provided, where a user is operating the image forming apparatus, and where a user is apart from the image forming apparatus. Therefore, it is possible to realize an image forming apparatus having a simple structure and of which an operational status can be visually recognized and checked easily.

Other objects, features and advantages of the present invention will become more apparent from the following detailed description when read in conjunction with the following drawings.

DETAILED DESCRIPTION OF THE PREFERRED EMBODIMENTS

Figure 1:
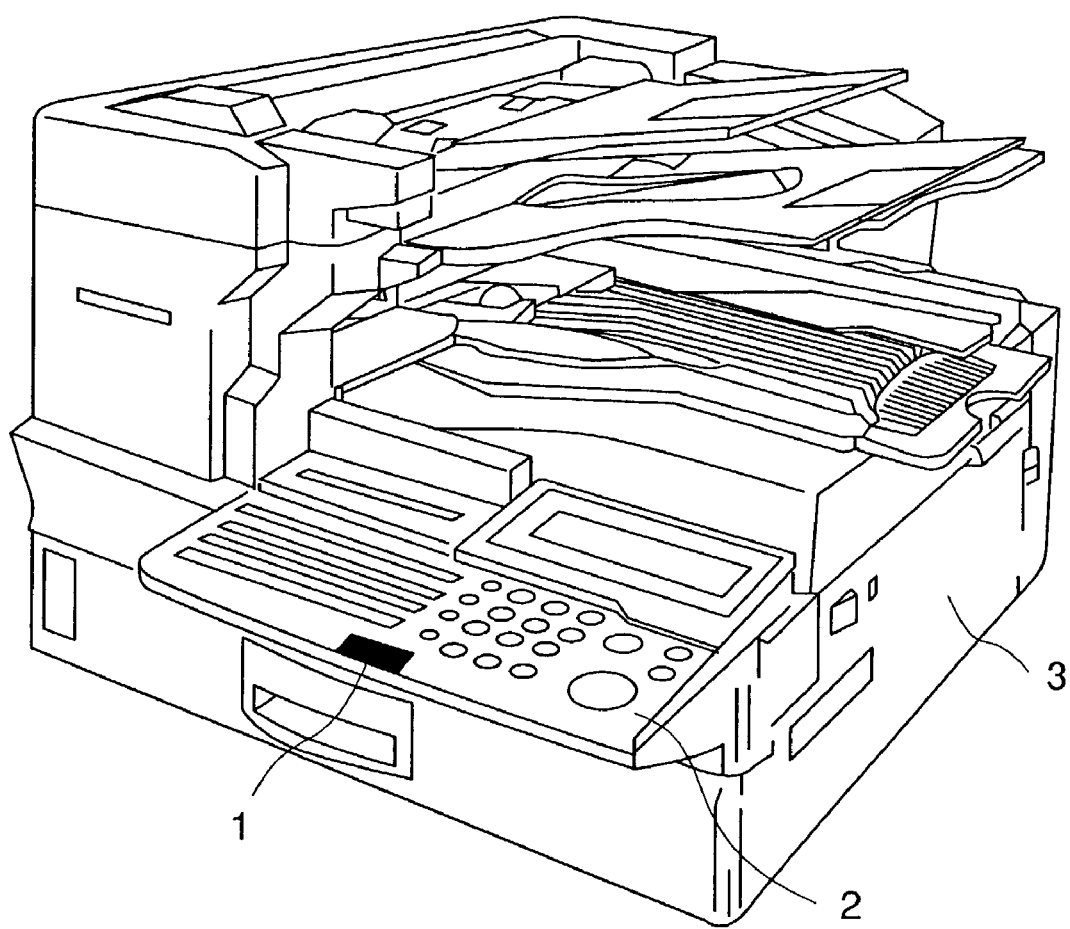
FIG. 1 is a perspective view of a conventional FAX.

In the following, a description will be given of a preferred embodiment of the present invention, by referring to the drawings.

Figure 2:
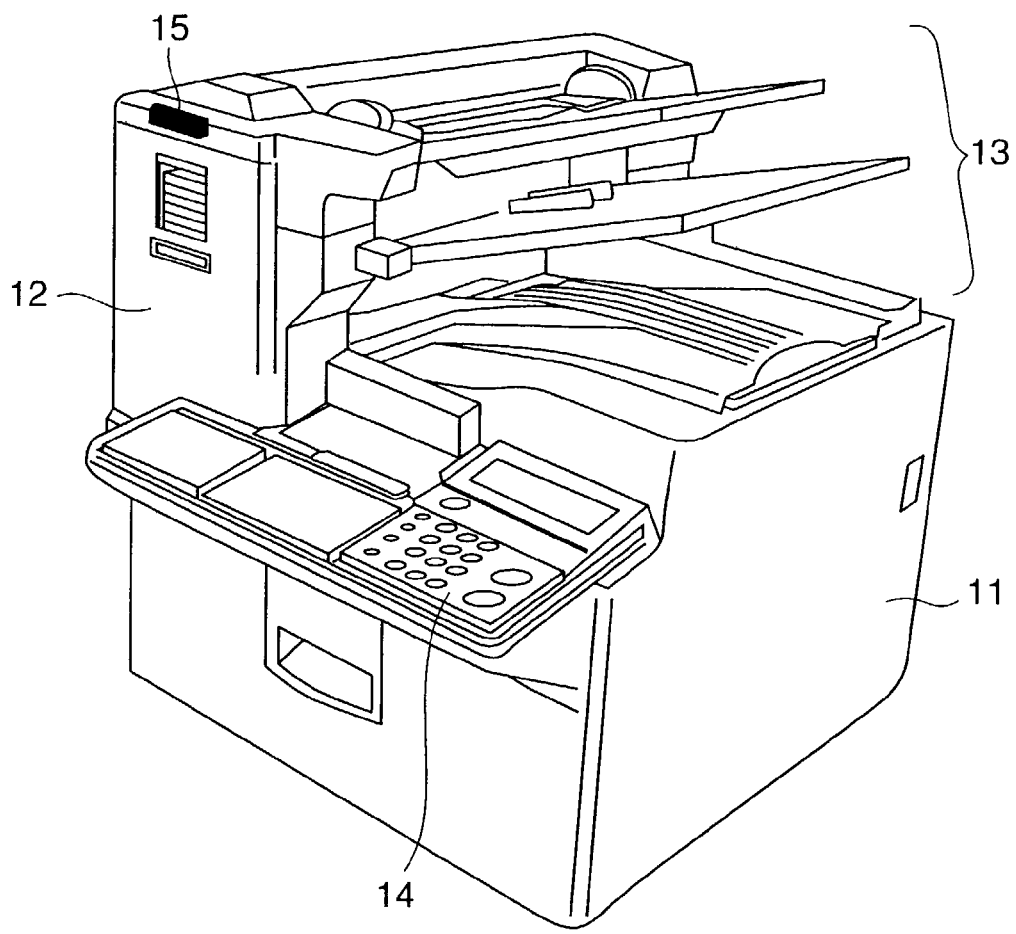
FIG. 2 is a perspective view showing a multifunctional type FAX for explaining an embodiment of the present invention.

FIG. 2 is a perspective view of a multifunctional type FAX for explaining the embodiment of the present invention. The multifunctional type FAX includes a housing body 11, an extended housing 12, and a paper feeding/ejecting part 13. The housing body 11 contains main components (which will be described later) of the multifunctional type FAX. The extended housing 12 is integrally provided to a side of the housing body 11, and includes a paper carrying part (not shown) that includes a paper feeding part and/or an ejecting part. The paper feeding/ejecting part 13 includes a paper feeding tray of the paper feeding part and an ejecting tray of the paper ejecting part, and is provided on a side of the extended housing 12 that is mounted on the housing body 11.

Figure 3:
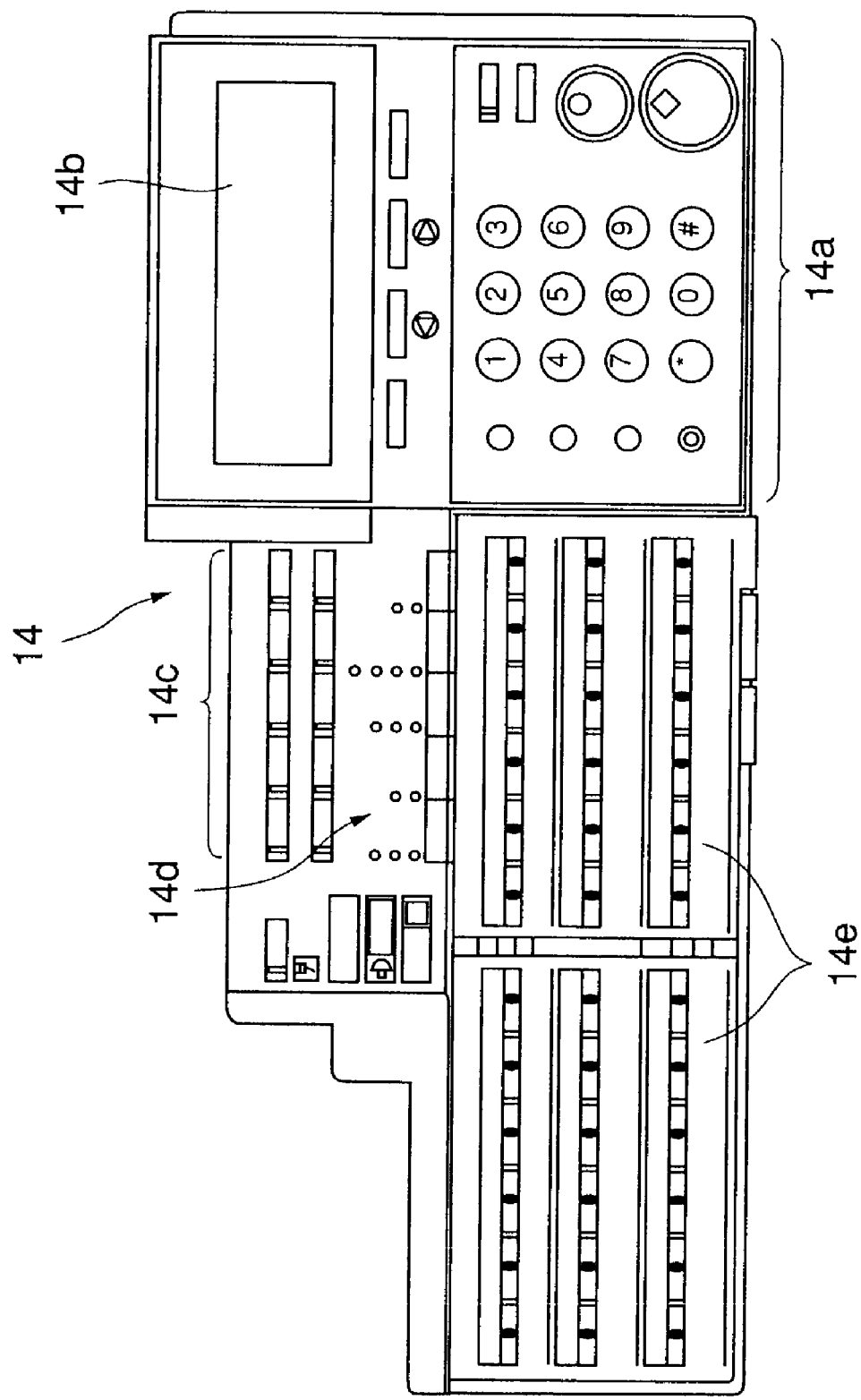
FIG. 3 is an enlarged view of an operation panel according to the embodiment.

Further, the multifunctional type FAX includes an operation panel 14. The operation panel 14 is an operation part for a user to input various operation modes, and is provided so as to extend from the top toward the front side of the housing body 11. As shown in FIG. 3, the operation panel 14 includes a key group 14a, such as a start key, a stop key, and numeric pads, a liquid crystal display (LCD) 14b, function keys 14c, light emitting diodes (LED) 14d for displaying settings status, and switching cards 14e for recording addresses.

Figure 4:
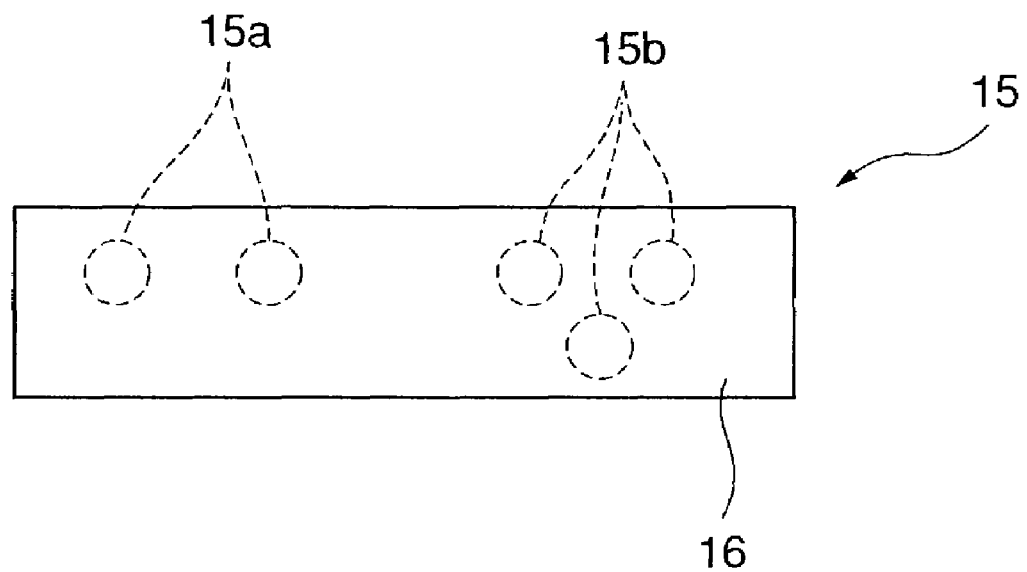
FIG. 4 is an enlarged view of a status display part according to the embodiment.

Additionally, the multifunctional type FAX includes a status displaying part 15. The status displaying part 15 is provided so as to indicate whether or not various functions of the multifunctional type FAX can be used. The status displaying part 15 is provided on a higher part of the extended housing 12 than the location of the operation panel 14, or at the highest location of the multifunctional type FAX. In this embodiment, as shown in FIG. 4, the status display part 15 includes two red LEDs 15a and three green LEDs 15b. The red color emitting LEDs 15a are placed on the left side to emit red light and green color emitting LEDs 15b are placed on the right side to emit green light, through a cover 16 having a light transmission property, which is provided on the light emitting side of the red LEDs 15a and green LEDs 15b.

Figure 5:
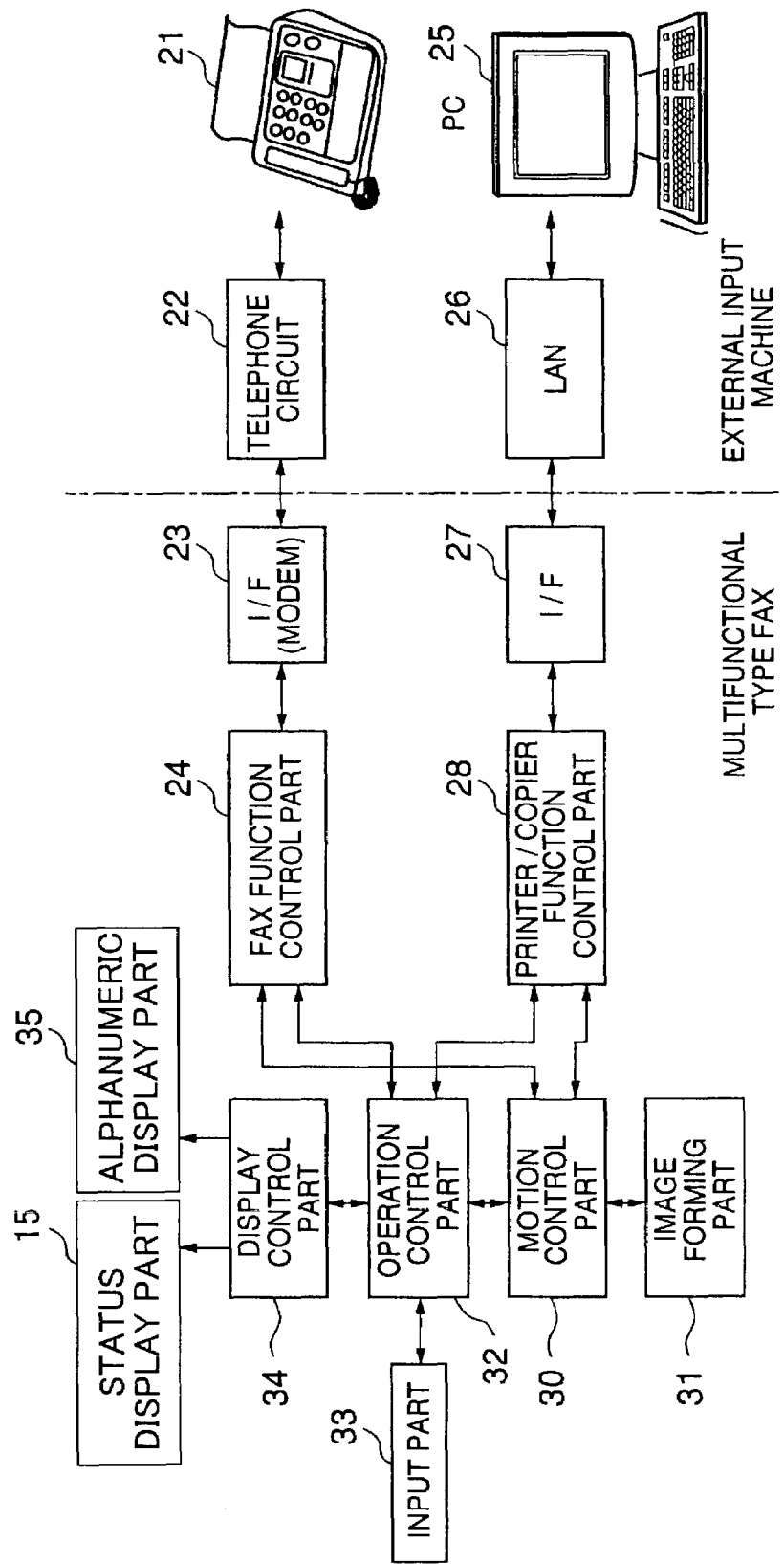
FIG. 5 is a block diagram showing a general structure of a communication/image forming control system of the multifunctional type FAX according to the embodiment.

FIG. 5 is a block diagram showing the general structure of a communication/image forming control system of the multifunctional type FAX. In FIG. 5, an external FAX 21 is connected to a FAX function control part 24 through an interface (I/F) 23 including a modem of the multifunctional type FAX and a telephone circuit 22. Additionally, a PC (personal computer) 25 is connected to a printer/copier function control part 28 through an I/F 27 of the multifunctional type FAX and a LAN (Local Area Network) 26. A plurality of each of these external input apparatuses can be simultaneously connected to the multifunctional type FAX.

A motion control part 30 inputs/outputs data from/to the FAX function control part 24 and printer/copier function control part 28. Additionally, the motion control part 30 performs motion control on each apparatus, such as an engine of an image forming part 31 and a paper carrying mechanism part including the paper feeding part and ejecting part. An operation control part 32 receives data, such as a setting mode set by a user, from an input part 33, such as the operation panel 14. In addition, the operation control part 32 inputs/outputs data from/to the FAX function control part 24 and printer/copier function control part 28 A display control part 34 displays characters, numbers, symbols, and the like on the LCD 14b, which is included in the operation panel 14. Further, the display control part 34 drives and controls an alphanumeric display part 35, which lights each of the LEDs 14d, and a status display part 15 including the red LEDs 15a and green LEDs 15b.

As mentioned above, the multifunctional type FAX according to the above-mentioned embodiment includes the I/Fs 23 and 27, through which image data are input from the external FAX 21 and PC 25, respectively. The I/Fs 23 and 27 are configured so as to correspond to transmitting/receiving formats of data or data processing formats of the external FAX 21 and PC 25.

For example, image data, which are transmitted from the external FAX 21 according to a predetermined protocol, pass through the I/F 23 provided with the modem function, are input to the FAX function control part 24 so that data processing is performed on the image data, and are output to the motion control part 30. The motion control part 30 outputs image forming control data to the image forming part 31, and causes the image forming part 31 to operate so as to perform image forming on recording paper. A setting of a transmitting/receiving mode from a user on the receiving side, and setting data for a mode for image forming are input to the operation control part 32. Thus, the operation control part 32 can change or control the motion control part 30.

Additionally, image data, which are transmitted from the PC 25 through the LAN 26, for example, go through the I/F 27, are input to the printer/copier function control part 28 so that data processing is performed on the image data, and are output to the motion control part 30. Thereby, as mentioned above, the image forming part 31 performs image forming. The operation control part 32 receives setting data for such as the mode setting for image forming from a user. Thus, the operation control part 32 can change or control the motion control part 30. In a case where a plurality of PCs 25 send data to the multifunctional type FAX, the multifunctional type FAX performs image forming by receiving the data sequentially in accordance with timing of sending by the PCs 25.

Further, the multifunctional type FAX according to this embodiment can also convert images and documents, which are created by the PC 25, to FAX transmission data through the printer/copier function control part 28 and FAX function control part 24, and transfer the data thereof to the external FAX 21 through the I/F 23.

Additionally, the multifunctional type FAX can perform data processing on transmission data from the external FAX 21 by the FAX function control part 24 and printer/copier function control part 28, and transfer the data thereof to the plurality of PCs 25 through the LAN 26.

The display control part 34 outputs display control data to the alphanumeric display part 35 by receiving data, such as a state of transmission/reception, a state of control, and states of various settings, from the motion control part 30 and operation control part 32. Additionally, the display control part 34 monitors the state of transmission/reception and state of control from the motion control part 30 and the operation control part 32. Further, the display control part 30 controls lighting of the status display part 15 by outputting lighting control data so as to, for example, light the red LEDs 15a in a case where paper should be replenished, or where trouble occurs in image forming or paper handling, and to light the green LEDs 15b in a case where the multifunctional type FAX cannot immediately receive data or perform image forming, such as when data are being transmitted from the PC 25, when the multifunctional type FAX is performing FAX transmission/reception, and the like.

The lighting may be performed such that the LEDs 15a and 15b are lighted only in a case where the multifunctional type FAX is not in a normal (usual) state, for example. In addition, the lighting may also be controlled such that the status of the multifunctional type FAX can be determined by a color, by changing the color of the light such that the green LEDs are lighted in the normal state, and the red LEDs are lighted in a state other than the normal state, for example. Further, whether or not the multifunctional type FAX is in the normal state may be indicated by changing a cycle of the lighting. Moreover, various states of the multifunctional type FAX may be indicated by appropriately combining and changing the color of the light and the cycle of the lighting.

In addition, it is preferable to use light emitting diodes, which have good directivity, as light emitting sources of the status display part 15. However, normal lamps may be used as the light emitting sources.

In this embodiment, the status display part 15 is provided in the higher part of the extended housing 12, which is positioned higher than the location of the operation panel 14, or the highest location of the multifunctional type FAX. Thus, blocking the light path of the status display part 15 becomes unlikely, and a person who is apart from the multifunctional type FAX as well as a person who is using the multifunctional type FAX can see the status display part 15 without the viewing path being blocked by something. Therefore, it is possible to ensure visibility of the status display part 15 over a fairly broad area.

Figure 6:
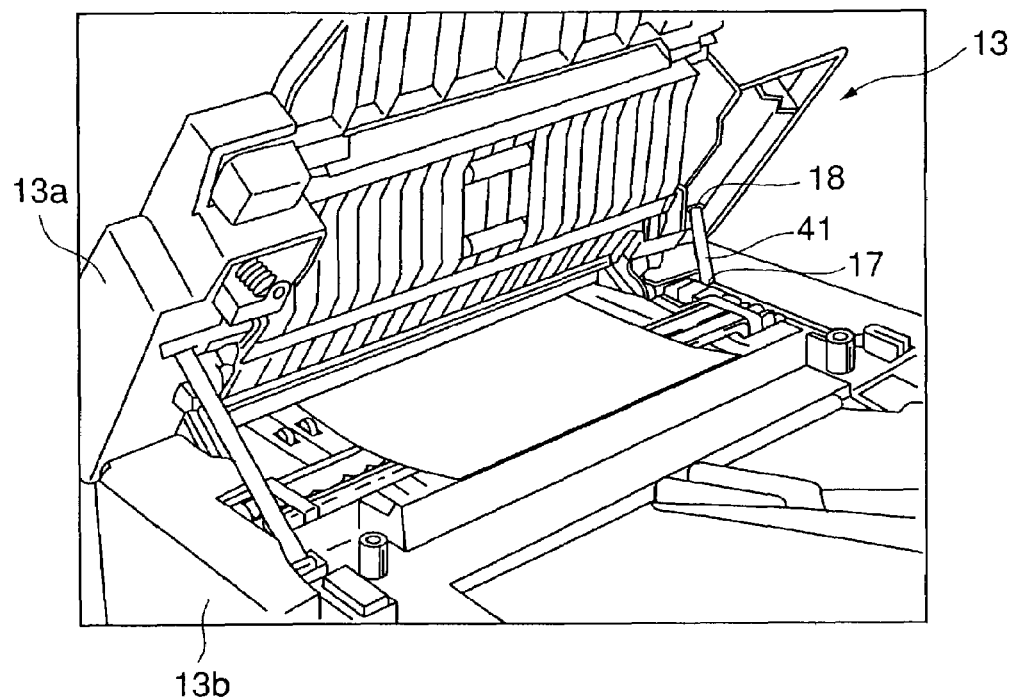
FIG. 6 is a perspective view showing a state where an upper paper feeding/ejecting part according to the embodiment is opened.

As mentioned above, in this embodiment, the operation panel 14 and status display part 15 are separated. Further, as shown in FIG. 6, the paper feeding/ejecting part 13 is separated into an upper paper feeding/ejecting part 13a and a lower paper feeding/ejecting part 13b. The upper paper feeding/ejecting part 13a is supported at a side part (right side of the extended housing in FIG. 2) of the extended housing 12 so that the upper paper feeding/ejecting part 13a can rotate and the paper carrying path can be opened in order to fix problems in paper handling. Therefore, measures are taken in the inner structure including the wiring of the signal cables connected to the status display part 15.

Figure 7:
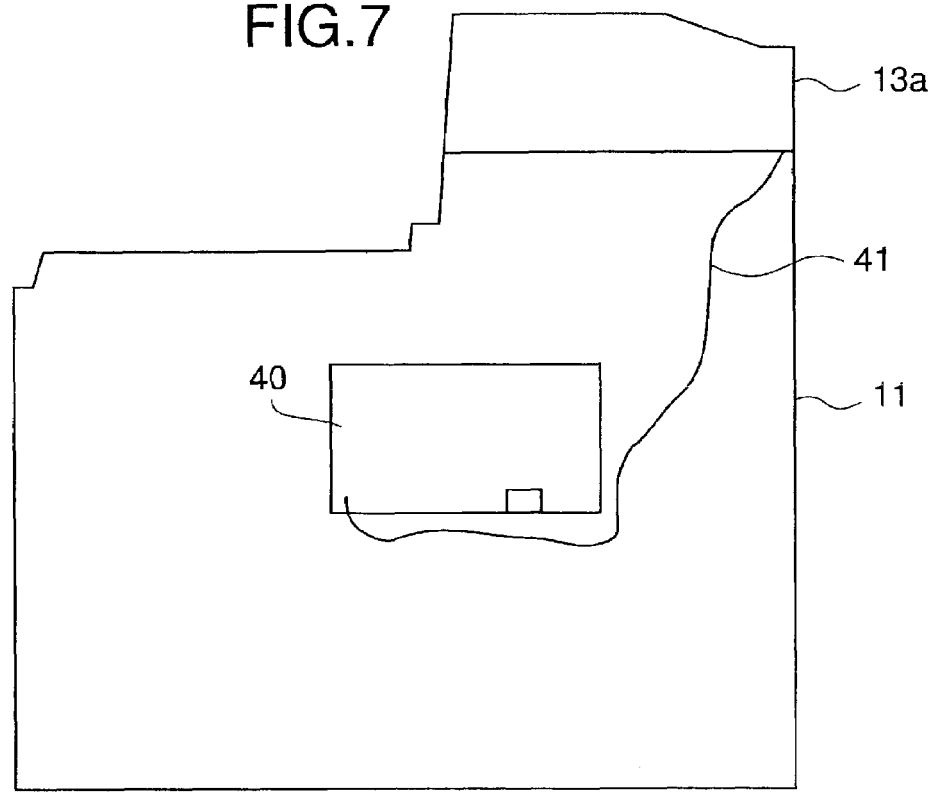
FIG. 7 is a back view showing signal cables and the like wired to the status display part of the multifunctional type FAX according to the embodiment.
Figure 8:
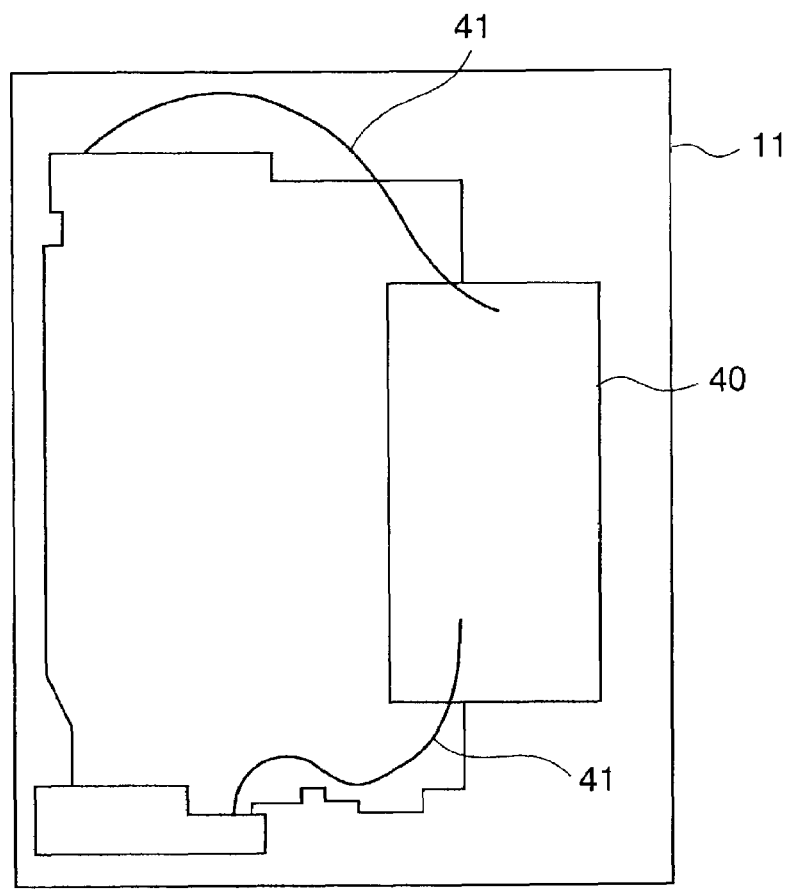
FIG. 8 is a plan view showing the signal cables and the like wired to the status display part of the multifunctional type FAX according to the embodiment.

FIG. 7 is a backside (interior) view showing the signal cables and the like wired to the status display part 15 of the multifunctional type FAX of this embodiment. FIG. 8 is a plan view showing the signal cables 41 and the like wired to the status display part 15 of the multifunctional type FAX. A main substrate 40, on which various control circuits and the like are mounted, is provided inside the housing body 11 that is shown in FIG. 2. A plurality of signal cables 41 (in FIGS. 7 and 8, for convenience of explanation, only typical examples are shown) are wired from the main substrate 40 to the upper paper feeding/ejecting part 13a while avoiding the locations of a recording mechanism part (not shown), draft reading mechanism part (not shown) and the like (the same applies to power cables), so that the cables 41 reach a circuit board of the status display part 15.

The upper paper feeding/ejecting part 13a is supported by the extended housing 12 such that the upper feeding/ejecting part 13a can rotate. Thus, in order to introduce the signal cables 41 from the main substrate 40 into the lower paper feeding/ejecting part 13b, as shown in FIG. 6, throughholes 17 and 18 are formed in the lower paper feeding/ejecting part 13b and upper paper feeding/ejecting part 13a, respectively, so that the signal cables 41 can run through the throughholes 17 and 18. At the same time, in a case where the upper paper feeding/ejecting part 13a rotates, the signal cables 41 enter into the lower paper feeding/ejecting part 13b and upper paper feeding/ejecting part 13a through the throughholes 17 and 18, respectively, so that the signal cables 41 are not pinched when the upper paper feeding/ejecting part 13a is closed.

Figure 9:
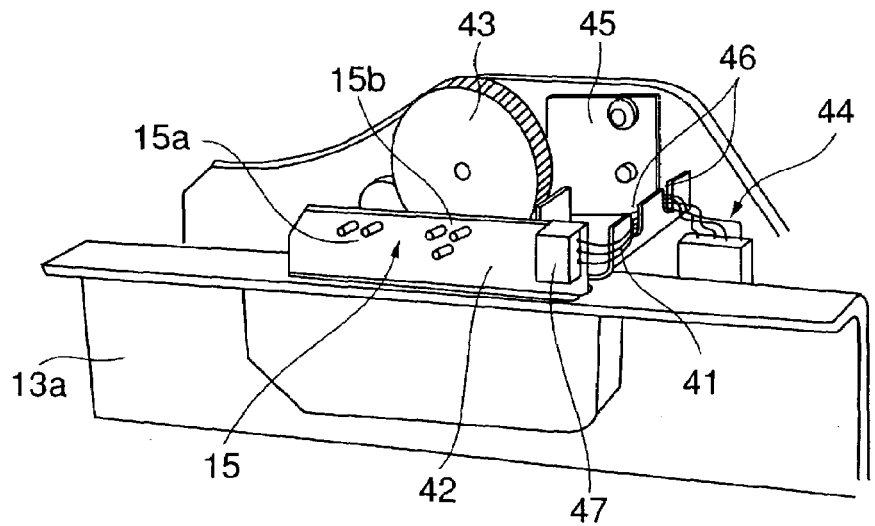
FIG. 9 is a perspective view showing an inner part of the upper paper feeding/ejecting part according to the embodiment.
Figure 10:
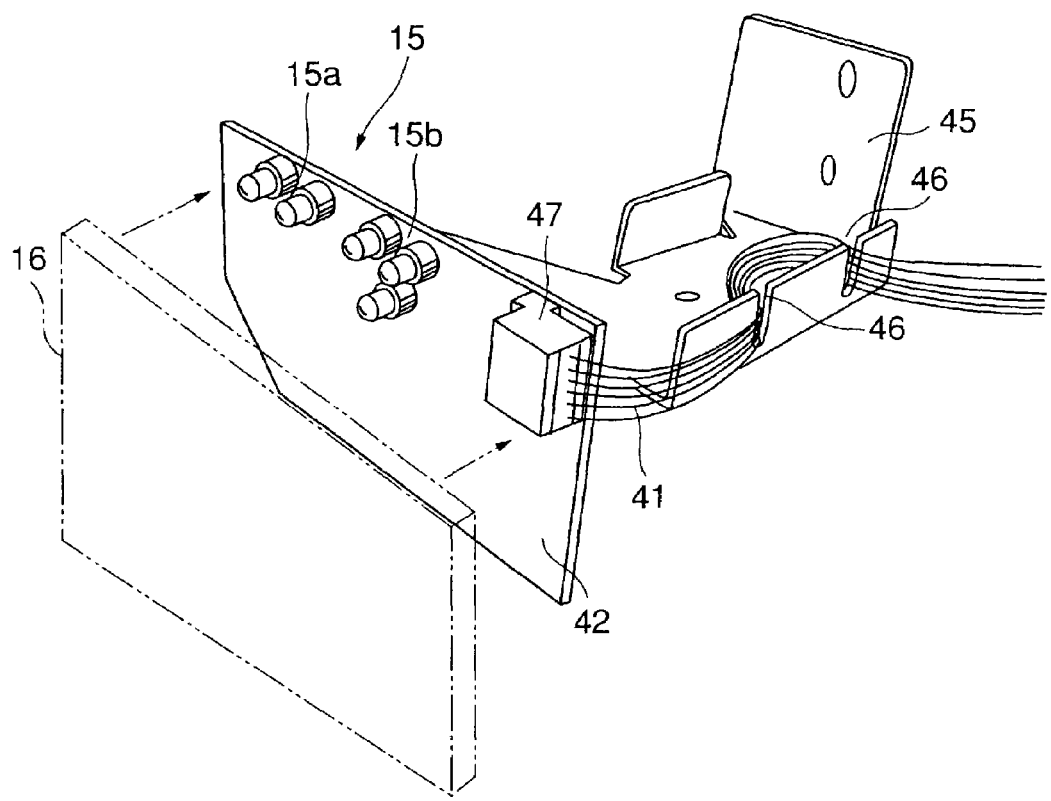
FIG. 10 is a perspective view of a casing for fixing a circuit board of the status display part and the signal cables according to the embodiment.

For example, as shown by the perspective view of FIG. 9, the upper paper feeding/ejecting part 13a, to which a circuit board 42 of the status display part 15 is provided, includes a gear 43, a pulley (not shown), a belt (not shown), an automatic draft carrying mechanism 44 that drives a draft carrying roller (not shown) and the like. As shown in FIG. 10, the circuit board 42 of the status display part 15 is fixed to a front side of a casing 45. The casing 45 is provided so as to straddle an upper side of a part of the automatic draft carrying mechanism 44, as shown in FIG. 9. Engaging notches 46 are formed on the casing 45. The signal cables 41 are fixed to the engaging notches 46 so that the signal cables 41 do not move. The signal cables 41 and the circuit board 42 are electrically connected by a connector 47.

The circuit board 42 of the status display part 15 is provided close to an outer side of the upper paper feeding/ejecting part 13a. Additionally, the cover 16 having a light transmission property is provided in front of the red LEDs 15a and green LEDs 15b. For this reason, the red LEDs 15b and green LEDs 15b are positioned on the outer side of the extended housing 12 inside the cover 16 and also close to the cover 16. Accordingly, optical loss of light that projects through the cover 16 to the outside is small, and it is possible to clearly visually recognize the light emitting state of the light from outside. Further, it is possible to use LEDs consuming little power so as to reduce operating costs. In addition, according to this embodiment, assembly and maintenance of the multifunctional type FAX is easier than a case wherein the circuit board 42 is provided to an inner part of the upper paper feeding/ejecting part 13a.

Figure 11:
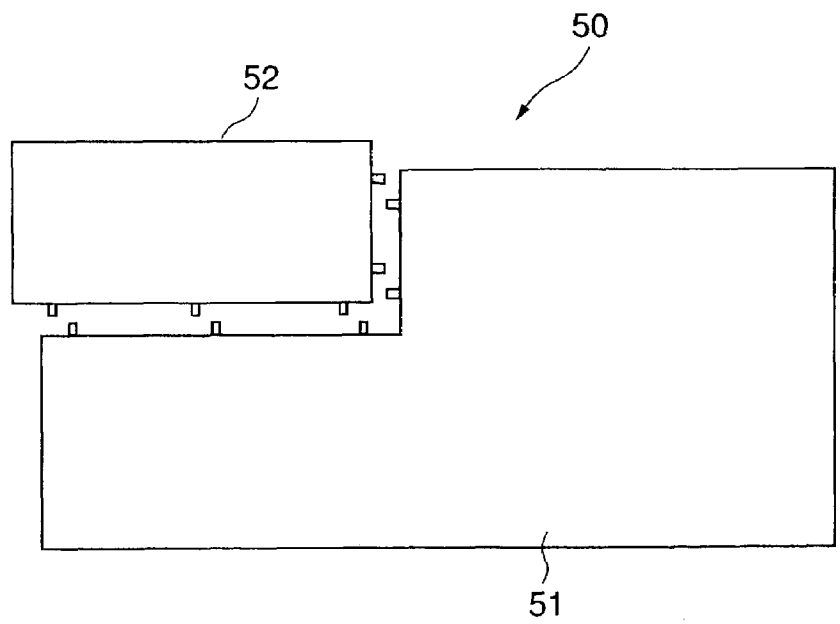
FIG. 11 is a schematic diagram for explaining the forming of a circuit board according to the embodiment.

Additionally, in this embodiment, the circuit board 42 of the status display part 15 and a circuit board of the operation panel 14 of FIG. 3 are provided separately. Thus, a different part must be provided for each of the circuit boards. However, as shown in FIG. 11, it is possible to prevent increase in costs by forming a circuit board part 51 of the status display part 15 and a circuit board part 52 for the operation panel 14 on a single circuit board 50, cutting the circuit board 50 into the circuit boards 51 and 52, and using each of the circuit boards 51 and 52.

The present invention is not limited to the specifically disclosed embodiments, and variations and modifications may be made without departing from the scope of the present invention.

The present application is based on Japanese priority applications No. 2001-245144 filed on Aug. 13, 2001, and No. 2001-358771 filed on Nov. 26, 2001, the entire contents of which are hereby incorporated by reference.

What is claimed is:

1. An image forming apparatus configured to receive image data from a plurality of external input means including a facsimile machine and a personal computer and configured to form an image on a sheet of paper based on the image data, comprising:

an operation part configured for a user to perform an input/output operation in a front part of a housing formed with a step, the operation part including a display screen;

an extended housing provided on the housing such that a top of the extended housing is higher than a location of the operation part, the extended housing including a lower part and an upper part configured to rotate relative to the lower part; and a light emitting part separate from the display screen and configured to indicate an operating state of the image forming apparatus, said light emitting part being located on the upper part, wherein the extended housing includes a first throughhole on the upper part and a second throughhole on the lower part, and a signal cable is connected between the light emitting part and a main substrate located in the housing such that the signal cable passes through the first and second throughholes.

2. The image forming apparatus as claimed in claim 1, wherein at least one of a paper feeding part and an ejecting part is provided at a side part of the extended housing.

3. The image forming apparatus as claimed in claim 1, wherein the light emitting part is controlled so as to change light emitting states between a normal operation state and an error state in an image forming apparatus.

4. The image forming apparatus as claimed in claim 3, wherein the light emitting state is changed by changing a color of emitted light.

5. The image forming apparatus as claimed in claim 3, wherein the light emitting state is changed by changing a light emitting cycle of emitted light.

6. The image forming apparatus as claimed in claim 1, wherein the light emitting part includes a directional light emitting diode.

7. The image forming apparatus as claimed in claim 1, wherein the light emitting part is located at a highest part of the extended housing.

8. An image forming apparatus configured to receive image data from a plurality of external input means and configured to form an image on a sheet of paper based on the image data, comprising:

an operation part in a front part of a housing formed with a step, the operation part configured for a user to perform an input/output operation and including a display;

an extended housing provided on the housing such that a top of the extended housing is higher than a location of the operation part, the extended housing including a lower part and an upper part configured to rotate relative to the lower part; and a light emitting part, directly mounted in a side wall of the extended housing, configured to indicate an operating state of the image forming apparatus and configured to emit light to indicate when the image data is being received, said light emitting part being located on the upper part, wherein the extended housing includes a first throughhole on the upper part and a second throughhole on the lower part, and a signal cable is connected between the light emitting part and a main substrate located in the housing such that the signal cable passes through the first and second throughholes.

9. The image forming apparatus claimed in claim 1, wherein the throughholes are configured to permit the signal cable to enter the lower part as the upper part rotates toward the lower part.

10. The image forming apparatus claimed in claim 8, wherein the throughholes are configured to permit the signal cable to enter the lower part as the upper part rotates toward the lower part.

* * * * *